3,130,179
LINEAR POLYUREAS
Robert J. Cotter, New Brunswick, N.J., assignor to Union Carbide Corporation, a corporation of New York
No Drawing. Filed Feb. 9, 1960, Ser. No. 7,519
20 Claims. (Cl. 260—77.5)

This invention relates to linear polyureas. More particularly, this invention relates to thermoplastic, linear polyureas which have excellent resistance to acids and bases and, being crystalline, can be formed into fibers and film material having excellent mechanical strengths.

The linear polyureas of the present invention are prepared by polymerizing a piperazine-1,4-di-carbonyl halide having the general formula:

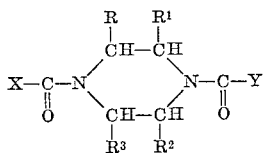

wherein X and Y are halogen atoms, i.e., chlorine, bromine, fluorine, or iodine; R, $R^1$, $R^2$, and $R^3$ are monovalent hydrocarbon radicals or hydrogen, with an organic di-secondary diamine for a period of time sufficient to produce a thermoplastic polyurea.

The polymerization reaction which results in the preparation of thermoplastic, linear polyureas in accordance with the present invention can be illustrated by the following equation wherein the piperazine-1,4-di-carbonyl halide is represented by the general formula and the organic, secondary diamine is N,N'-dimethyl hexamethylene diamine in Equation I and piperazine in Equation II.

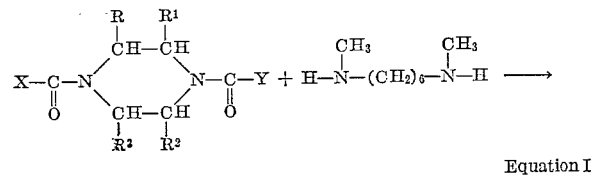

Equation I

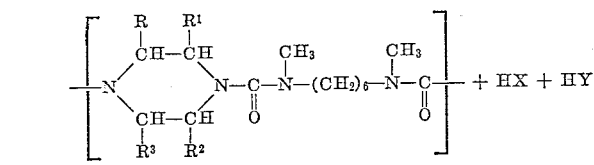

Equation II wherein R, $R^1$, $R^2$, $R^3$, $R^4$, X and Y are as previously defined.

Suitable monovalent hydrocarbon radicals for R, $R^1$, $R^2$, and $R^3$ include, among others, the alkyl radicals, such as methyl, ethyl, n-propyl, n-butyl, isobutyl, and the like; cycloalkyl radicals, such as cyclohexyl and the like; alkyl radicals having cycloalkyl substituents, such as cyclohexylmethyl and the like; aromatic hydrocarbon radicals, such as phenyl and the like. Illustrative of suitable compounds are 2-methyl piperazine 1,4-di-carbonyl chloride, 2,5-dimethyl-piperazine-1,4-di-carbonyl chloride, 2-isobutyl piperazine-1,4-di-carbonyl chloride, 2-cyclohexyl-piperazine, 1,4-di-carbonyl chloride, 2-phenyl-piperazine,1,4-di-carbonyl chloride and the like. Particularly desirable piperazine-1,4-di-carbonyl halides are those wherein R, $R^1$, $R^2$, and $R^3$, which can be the same or different, are hydrogen or monovalent hydrocarbon radicals having a maximum of six carbon atoms.

Illustrative of suitable organic, secondary diamines for purposes of this invention are those having the general formula:

wherein $R^5$ and $R^6$ are monovalent hydrocarbon radicals and $R^4$ is a divalent hydrocarbon radical.

The term "monovalent hydrocarbon radical" as used herein with respect to the organic aliphatic secondary diamines is intended to encompass substituted hydrocarbon radicals as well as unsubstituted hydrocarbon radicals.

Exemplary of such radicals are alkyl radicals, such as methyl, ethyl, n-propyl, n-butyl, n-hexyl, 2-ethyl-n-hexyl, n-octyl, n-dodecyl, and the like; cycloalkyl radicals, such as cyclohexyl and the like; alkenyl and cycloalkenyl radicals, such as allyl, cyclopentenyl, and the like; alkoxy and aryloxy substituted alkyl and cycloalkyl radicals, such as methoxymethyl, ethoxyethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, 2-phenoxycyclohexyl, and the like; aralkyl radicals, such as benzyl, 2-phenylethyl, 3-phenyl-n-propyl, 2-phenyl-n-butyl, 2-phenyl-n-dodecyl, and the like; aryl radicals, such as phenyl, naphthyl, and the like; halogenated aryl radicals, such as p-chlorophenyl, p-bromophenyl, p-fluorophenyl, p-iodophenyl, 2-chloronaphthyl, 2-bromonaphthyl, and the like; alkoxy and aryloxy substituted aryl radicals, such as p-methoxyphenyl, p-ethoxyphenyl, p-phenoxyphenyl, and the like; alkaryl radicals, such as o-methylphenyl, p-ethylphenyl, p-n-propylphenyl, o-n-propylphenyl, o-n-butylphenyl, p-n-dodecylphenyl, p-(2-ethyl-n-hexyl) phenyl, and the like; nitro substituted aryl radicals, such as p-nitrophenyl, 2-nitronaphthyl, and the like.

The term "divalent hydrocarbon radical" as used herein with respect to the organic secondary diamines is intended to encompass unsubstituted and substituted divalent hydrocarbon radicals. Illustrative of suitable radicals are alkylene radicals, such as ethylene, trimethylene, tetramethylene, pentamethylene, hexamethylene, 2-ethylhexamethylene, octamethylene, nonamethylene, decamethylene, and the like; the cycloaliphatic radicals, such as 1,4-cyclohexane, 1,3-cyclohexane, 1,2-cyclohexane, and the like; alkoxy and aryloxy substituted alkylene and cycloaliphatic radicals, such as methoxy methylene, ethoxy-methylene, ethoxy ethylene, 2-ethoxy-trimethylene, 3-ethoxy-pentamethylene, 1,4-(2-methoxy)cyclohexane, phenoxy ethylene, 2-phenoxy trimethylene, 1,3-(2-phenoxy) cyclohexane, and the like; aralkylene radicals, such as phenyl ethylene, 2-phenyl trimethylene, 1-phenylpentamethylene, 2-phenyl decamethylene, and the like; aromatic radicals, such as phenylene, naphthylene, and the like; halogenated aromatic radicals, such as 1,4-(2-chloro)phenylene, 1,4-(2-bromo)phenylene, 1,4-(2-fluoro)phenylene, and the like; alkoxy and aryloxy substituted aromatic radicals, such as 1,4-(2-methoxy)phenylene, 1,4-(2-ethoxy)phenylene, 1,4-(2-n-propoxy)phenylene, 1,4-(2-phenoxy)phenylene, and the like; alkyl substituted aromatic radicals, such as 1,4-(2-methyl)phenylene, 1,4-(2-ethyl)phenylene, 1,4-(2-n-propyl)phenylene, 1,4-(2-n-dodecyl)phenylene; unsaturated radicals, such as 2-butene-1,4-, 2-pentene-1,5-, 3-methyl-hex-3-ene-1,6-, 2,4-dimethylbut-2-ene-1,4-, 4-n-butylhept-4-ene-1,7-, and the like; dimethyl ether-1,1'-, diethyl ether-2,2'-, di-n-propyl ether-3,3'-, and the like. Specific organic secondary diamines having the general formula:

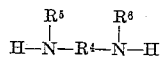

as previously defined are

N,N'-dimethylhexamethylene diamine,
N,N'-dimethyl-(2-phenoxy)-trimethylene diamine,
N,N'-dimethyl-decamethylenediamine,
N,N'-dimethyl-2-phenyldecamethylene diamine,
N,N'-dimethyl-3,3'-diaminodiphenyl,
N-methyl-N'-ethyl hexamethylene diamine,
N-ethyl-N'-n-propyl-1,4-phenylene diamine,
N-phenyl-N'-(3-chloropropyl)-1,4-phenylene diamine,
N-ethyl-N'-(2-phenyl-n-decyl)-butane-1,4-diamine, and other like compounds free of interfering groups, i.e., those which will react with the carbonyl halide groups of the piperazine-1,4-di-carbonyl halide. Particularly desirable organic diamines are those wherein $R^4$, $R^5$, and $R^6$ each contains a maximum of 20 carbon atoms.

Also suitable for purposes of this invention are heterocyclic, secondary diamines such as those having the general formula:

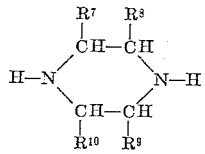

wherein $R^7$, $R^8$, $R^9$, and $R^{10}$ are hydrogen or monovalent hydrocarbon radicals, such as the alkyl radicals, illustrative of which are methyl, ethyl, n-propyl, n-butyl, isobutyl, and the like; cycloalkyl radicals, such as cyclohexyl and the like; alkyl radicals having cycloalkyl substituents such as cyclohexyl methyl and the like; aromatic hydrocarbon radicals, such as phenyl and the like. Among specific heterocyclic secondary diamines can be noted piperazine, 2-methyl piperazine, 2,5-dimethyl piperazine, 2-isobutyl piperazine, 2-cyclohexyl piperazine, 2-phenyl piperazine, and the like. Particularly desirable heterocyclic secondary diamines are those wherein $R^7$, $R^8$, $R^9$, and $R^{10}$ which can be the same or different, have a maximum of six carbon atoms.

Various amounts of the reactants can be used in the polymerization reaction to produce the linear polyureas of the present invention. Generally, at least 90 percent of stoichiometric to as much as 100 percent in excess of stoichiometric and higher, if so desired, of the organic secondary diamine is used. It is preferred, however, to use a stoichiometric amount. For purposes of stoichiometric calculations involving the organic diamine and the piperazine-1,4-di-carbonyl halide, one amino group

is deemed to react with one carbonyl halide group.

When using less than about 100 percent in excess of stoichiometric of the organic secondary diamine, it is desirable to have present in the polymerization reaction mixture a base which is capable of reacting with the free hydrogen halide present in the reaction mixture to produce the corresponding salt. By the term "free hydrogen halide" is meant the hydrogen halide which is formed in the reaction mixture and which has not been neutralized by the organic secondary diamine. The presence of a base is desirable when using organic secondary diamines in amounts less than 100 percent in excess of stoichiometric in order to insure that the free hydrogen halide present in the reaction mixture will not effectively attack the linear polyurea which is being produced, thus materially affecting the yield and quality of the polyurea. Suitable bases which will "accept" hydrogen halide include, among others, the water-soluble inorganic bases, such as the alkali metal hydroxides, illustrative of which are sodium hydroxide, lithium hydroxide, potassium hydroxide, and the like; the alkali metal carbonates, such as sodium carbonate, lithium carbonate, potassium carbonate, and the like. Also suitable are the organic bases such as the organic tertiary amines, particularly those having the general formula:

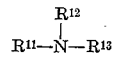

wherein $R^{11}$, $R^{12}$, and $R^{13}$ are monovalent hydrocarbon radicals free of olefinic and acetylenic unsaturation, such as methyl, ethyl, n-propyl, isopropyl, n-butyl, n-amyl, n-hexyl, 2-ethyl-n-hexyl, n-heptyl, n-octyl, n-nonyl, n-dodecyl, benzyl, 2-phenylethyl, 3-phenyl-n-propyl, 4-phenyl-n-butyl, 5-phenyl-n-amyl, 2 - phenyl - n - hexyl, 3-phenyl-n-heptyl, phenyl, o-methylphenyl, p-ethylphenyl, p-amylphenyl, o-n-butylphenyl, and the like. Specific compounds include, among others, trimethylamine, triethylamine, tri-n-propylamine, tri-n-butylamine, tri-n-dodecylamine, tri-n-docosylamine, tri-(2-phenylethyl)-amine, tribenzylamine, dimethyl-n-propylamine, diethyl-n-propylamine, methylethyl-n-propylamine, N,N-dimethylaniline, and the like. Particularly effective organic tertiary amines for purposes of this invention are those wherein $R^{11}$, $R^{12}$, and $R^{13}$ are either alkyl or aralkyl radicals, each having a maximum of 12 carbon atoms.

The actual amount of base used will depend upon the amount of the organic secondary diamine present in the reaction mixture. Sufficient base is used to effect substantially complete neutralization of the free hydrogen halide present in the mixture. When less than 100 percent in excess of stoichiometric of the organic secondary diamine is used, the base is used in stoichiometric amounts based on the amount of free hydrogen halide in the reaction mixture, so that the free hydrogen halide is neutralized, forming the corresponding salt.

In conducting the polymerization reaction, it is also desirable to have present in the reaction mixture sufficient water to effectively remove from the organic reactants salt formed on neutralization of the hydrogen halide. The water, in removing the salt from the organic reactants, facilitates recovery of the linear polyurea which is formed. The actual amount of water used can vary over a wide range of about 5 to 25 times by weight based on the combined weight of the organic secondary diamines and the "hydrogen halide accepting" base.

It is also preferred to conduct the polymerization reaction in the presence of an organic diluent which is a solvent for the piperazine-1,4-di-carbonyl halide and the organic secondary diamine and is non-reactive with respect to the starting materials and the linear polyurea which is formed. The use of an organic diluent also provides a medium in which the starting materials are brought into intimate contact and also facilitates removal of the linear polyurea from the reaction medium.

The actual organic diluent used will depend upon the reactants and the temperature at which the polymerization reaction to be conducted. The organic diluent should have a boiling point equal to or above the polymerization reaction temperature. It is customary to use the organic diluents in amounts of at least about 200 percent of the weight based on the weight by starting materials. The upper limit with respect to the amount of organic diluent used will depend upon the rate at which it is desired to conduct the reaction. The more dilute the reaction mixture, the slower the rate of reaction. From a practical standpoint, the organic diluent is used in amounts up to about 500 percent by weight based on the weight of the starting materials.

Suitable organic diluents include, among others, the aromatic hydrocarbons, such as benzene, xylene, and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons, such as methoxybenzene and the like; aliphatic hydrocarbons, such as n-hexane, n-heptane, and the like; halogenated aliphatic hydrocarbons, such as dichloromethane and the like; ethers, such as diethyl ether, diethyl ether of ethylene glycol, diethyl ether of 1,3-propylene glycol, dioxane, and the like; also suitable are petroleum ether, tetrahydrofuran, and the like. Mixtures of organic diluents can also be used.

The polymerization reaction is conducted, generally, under atmospheric pressures, although if desired, it can be conducted under subatmospheric or superatmospheric pressure.

The temperature at which the polymerization reaction can be conducted can vary over a wide range. Temperatures in the range of about 0° C. to about 150° C. are satisfactory. At temperatures lower than about 0° C., the polymerization reaction proceeds too slowly to be practical. A temperature in the range of about 25° C. to about 75° C. is most preferred.

The process of polymerizing a piperazine-1,4-bis-carbonyl halide with an organic secondary diamine in accordance with the present invention is conducted by simply admixing the starting materials and stirring the mixture at the desired temperature for a period of time sufficient to produce a thermoplastic polyurea. Usually the polymerization reaction proceeds substantially to completion in about one hour. Generally the piperazine-1,4-di-carbonyl halide is dissolved in an organic diluent and added to an aqueous mixture of an organic secondary diamine and a "hydrogen halide accepting" base.

Recovery of the linear polyurea from the reaction mixture can be accomplished by any one of a number fo convenient methods. For example, in those instances wherein the polyurea is soluble in the organic diluent used in the polymerization reaction, the reaction mixture can be poured into a solvent in which the linear polyurea is insoluble and the organic diluent is soluble with the result that the polyurea will precipitate out. The linear polyurea can then be recovered by a simple filtration operation and then, if desired, washed with various liquids such as water and the like.

The piperazine-1,4-di-carbonyl halides which can be polymerized in accordance with the present invention can be obtained by reacting a piperazine with a carbonyl halide such as carbonyl chloride, carbonyl fluoride, carbonyl bromide, carbonyl iodide, and the like in the presence of an inorganic base such as sodium hydroxide, sodium carbonate, and the like or an organic base, such as triethylamine and the like. Preparation of piperazine-1,4-di-carbonyl halides is further described in Example 1 of the specification and also in United States Patent 2,731,445 to E. L. Wittbecker, issued January 17, 1956, which is incorporated herein by reference.

In the examples which follow, which are illustrative and not intended to limit the scope of the invention in any manner, the procedure used to determine the reduced viscosity values was as follows. A 0.2 gram sample of the linear polyurea was weighed into a volumetric flask containing 100 ml. of solvent. The contents of the flask were stirred until solution of the polyurea was complete. The solution was then filtered through a sintered glass funnel and the viscosity of a 3 ml. sample determined on a Cannon viscometer at about 25° C. Reduced viscosity was determined by the use of the equation:

$$RV = \frac{ts - to}{cto}$$

wherein:

$to$ is the efflux time for the solvent
$ts$ is the efflux time for the polyurea solution
$c$ is the concentration of the solution in terms of grams of polyurea per 100 ml. of solution

EXAMPLE 1

*Polymerization of Piperazine-1,4-Di-Carbonyl Chloride With N,N'-Dimethylhexamethylene Diamine*

(a) *Preparation of piperazine-1,4-di-carbonyl chloride.*—Into a Pyrex glass flask equipped with a stirrer, dropping funnel, thermometer, and containing a solution of 150 grams (1.5 moles) of phosgene in 900 ml. of dichloromethane, there was added dropwise a solution of 51.6 grams (0.6 mole) of piperazine and 122 grams (1.21 mole) of triethylamine in 200 ml. of dichloromethane, while the contents of the flask were maintained at 0° C. to 5° C. After the addition was completed, the mixture was allowed to warm to room temperature, about 25° C., and was then filtered. The filtrate was poured into a separatory funnel and washed three times with 200 ml. portions of ice water. The organic layer was separated from the aqueous layers and dried over calcium chloride. The organic solution was then heated at 45° C. and under atmospheric pressure until the dichloromethane was distilled off, leaving behind a solid residue. The residue was then recrystallized from toluene yielding 60 grams (47% of theoretical) of piperazine-1,4-di-carbonyl chloride having a melting point of 151° C.–154° C.

(b) *Polymerization of piperazine-1,4-di-carbonyl chloride with N,N'-dimethylhexamethylene diamine.*—To a solution of 1.16 grams (0.01 mole) of N,N'-dimethyl-hexamethylene diamine and 2.23 grams (0.021 mole) of sodium bicarbonate in 15 ml. of water which was contained in a Pyrex glass flask equipped with a thermometer, dropping funnel, reflux condenser, and stirrer there was added a solution of 2.11 grams (0.01 mole) of piperazine-1,4-di-carbonyl chloride in 35 ml. of tetrahydrofuran. The mixture was heated under reflux for 1½ hours while being continuously stirred. At the end of 1½ hours the mixture was poured into a Waring Blendor containing 300 ml. portions of water and then dried by heating at 100° C. for 24 hours under a reduced pressure of 5 mm. Hg. 2.1 grams of the thermoplastic polyurea were recovered, which corresponded to a yield of 83 percent (based on the theoretical yield).

The polyurea had a reduced viscosity of 1.18 in p-chlorophenol, a melting point of 150° C. and was highly crystalline as determined by X-ray analysis.

The thermoplastic polyurea was formed into film material having a thickness of 5 mils by pressing in an electric laboratory press between aluminum foil at 400° F. and a pressure of 5000 p.s.i. for five minutes. Samples of the film were oriented by stretching the film using conventional apparatus so that a 200 percent stretch was effected at 95° C.–100° C. The percent stretch was determined by means of the equation:

$$\text{Percent stretch} = \frac{100 \times \text{area after stretching} - \text{area before stretching}}{\text{Area before stretching}}$$

Properties of the oriented and unoriented films are noted below:

|  | Film | |
| --- | --- | --- |
|  | Unoriented | Oriented |
| Tensile strength, p.s.i. ASTM D–882–56T | 2,750 | 37,000 |
| Percent Elongation | 23 | 40 |

To further demonstrate the excellent resistance of polyureas of the present invention to acids and bases, 1.0 gram of the polyurea prepared as described in Example 1 were placed in 15 ml. of glacial acetic acid (boiling point 118° C. and 1.0 gram of this polyurea was placed in di-n-butylamine (boiling point 160° C.) and refluxed for one hour. The polyurea had an initial reduced viscosity of 1.15. After reflux in glacial acetic acid and di-n-butylamine for 1 hour, the reduced viscosity values of the samples of polyurea refluxed were 0.64 and 0.62 respectively. A polyurea produced using the same reactants and same procedures described in Example 1 with the exception that a primary organic amine, hexamethylene diamine, was used in lieu of the secondary organic amine, N,N'-dimethyl-hexamethylene diamine was also refluxed as described. This latter polyurea had an initial viscosity of 1.18. After refluxing in acid, the polyurea did not have a measurable reduced viscosity indicating a complete degradation of the polyurea. The reduced viscosity of this polyurea dropped from 1.18 to 0.34 after refluxing in di-n-butylamine which indicated a high degree of degradation.

EXAMPLE 2

*Polymerization of Piperazine-1,4-Di-Carbonyl Chloride With Piperazine*

Into a Pyrex glass flask equipped with a stirrer, dropping funnel, thermometer and reflux condenser and containing 2.11 grams (0.01 mole) of piperazine-1,4-di-carbonyl chloride in 35 ml. of tetrahydrofuran, there was added a solution of 1.72 grams (0.01 mole) of piperazine and 2.23 grams (0.021 mole) of sodium carbonate in 15 ml. of water. The mixture was heated under reflux for 1½ hours while being continuously stirred. At the end of 1½ hours the mixture was poured into a Waring Blender containing 300 ml. of water with the result that the thermoplastic polyurea which had formed precipitated out of solution. The polyurea was washed three additional times in the Waring Blendor using 300 ml. portions of water and then dried by heating at 100° C. for 24 hours under a reduced pressure of 5 mm. Hg.

The polyurea had a reduced viscosity of 0.36 in p-chlorophenol, a melting point of 390° C. and was highly crystalline as determined by X-ray analysis.

The following table lists a number of thermoplastic polyureas which have been prepared using the same procedure as described in Example 1 and also using the various reactants in the molar amounts noted in the example, with the exception that various organic secondary diamines were used. The organic secondary diamines are noted in the following table:

TABLE I

| Diamine: | Reduced viscosity (in p-chlorophenol) |
|---|---|
| N,N'-dimethylethylene diamine | 0.43 |
| N,N'-dimethyltrimethylene diamine | 0.46 |
| N,N'-diphenylhexamethylene diamine | 0.12 |

The thermoplastic, linear polyureas of the present invention can be molded or otherwise formed in various shaped articles, for example film material which can be used as wrapping material and the like. In addition, the thermoplastic, linear polyureas can be extruded into fibers having excellent mechanical strengths.

What is claimed is:

1. Process for the preparation of a thermoplastic crystalline linear polyurea having a reduced viscosity of from about 0.12 to about 1.18 which consists of polymerizing, in a medium containing an organic diluent and water, at a temperature of from about 0° C. to about 150° C., a piperazine-1,4-dicarbonyl halide having the general formula:

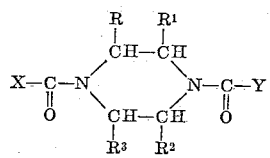

wherein X and Y are halogen atoms, R, R¹, R², and R³ are selected from the group consisting of hydrogen and monovalent hydrocarbon radicals with an organic secondary diamine, said diamine being present in at least about 90 percent of stoichiometric, and being selected from the group consisting of an organic secondary diamine having the formula:

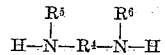

wherein $R^5$ and $R^6$ are monovalent hydrocarbon radicals and $R^4$ is a divalent hydrocarbon radical and an organic secondary diamine having the formula:

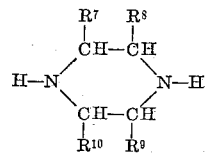

wherein $R^7$, $R^8$, $R^9$ and $R^{10}$ are selected from the group consisting of hydrogen and monovalent hydrocarbon radicals.

2. Process for the preparation of a thermoplastic, crystalline, linear polyurea having a reduced viscosity of from about 0.12 to about 1.18 which consists of reacting at a temperature of from about 0° C. to about 150° a mixture containing an organic diluent, water, a piperazine-1,4-di-carbonyl halide having the general formula:

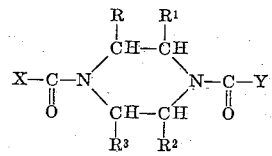

wherein X and Y are halogen atoms, R, $R^1$, $R^2$, and $R^3$ are selected from the group consisting of hydrogen and monovalent hydrocarbon radicals, an organic secondary diamine which is a member selected from the group consisting of an organic secondary diamine having the formula:

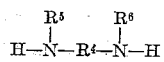

wherein $R^5$ and $R^6$ are monovalent hydrocarbon radicals and $R^4$ is a divalent hydrocarbon radical and an organic secondary diamine having the formula:

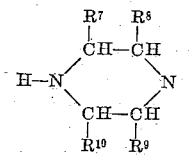

wherein $R^7$, $R^8$, $R^9$ and $R^{10}$ are selected from the group consisting of hydrogen and monovalent hydrocarbon radicals, said organic diamine being present in an amount of between 90 percent of stoichiometric to about 100 percent in excess of stoichiometric, and a base in an amount sufficient to neutralize free hydrogen halide present in said mixture.

3. Process as defined in claim 2 wherein the polymerization is conducted at a temperature of from about 25° C. to about 75° C.

4. Process as defined in claim 2 wherein the said diamine is present in about stoichiometric amounts.

5. Process as defined in claim 2 wherein the organic secondary diamine has the formula:

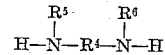

wherein $R^5$ and $R^6$ are monovalent hydrocarbon radicals and $R^4$ is a divalent hydrocarbon radical.

6. Process as defined in claim 5 wherein $R^5$ and $R^6$ are alkyl radicals and $R^4$ is an alkylene radical.

7. Process as defined in claim 2 wherein the organic secondary diamine has the formula:

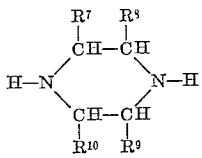

wherein $R^7$, $R^8$, $R^9$ and $R^{10}$ are selected from the group consisting of hydrogen and monovalent hydrocarbon radicals.

8. Process as defined in claim 7 wherein $R^7$, $R^8$, $R^9$ and $R^{10}$ are hydrogen.

9. A thermoplastic, crystalline, linear polyurea, having a reduced viscosity of from about 0.12 to about 1.18, which consists of the reaction product of a piperazine-1,4-di-carbonyl halide, said halide having the general formula:

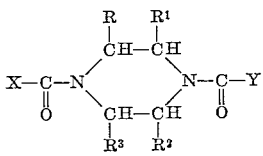

wherein X and Y are halogen atoms, R, $R^1$, $R^2$, and $R^3$ are selected from the group consisting of hydrogen and monovalent hydrocarbon radicals and an organic secondary diamine which is a member selected from the group consisting of an organic secondary diamine having the formula:

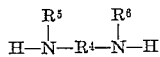

wherein $R^5$ and $R^6$ are monovalent hydrocarbon radicals and $R^4$ is a divalent hydrocarbon radical and an organic secondary diamine having the formula:

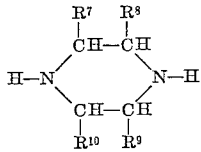

wherein $R^7$, $R^8$, $R^9$ and $R^{10}$ are selected from the group consisting of hydrogen and monovalent hydrocarbon radicals.

10. A thermoplastic, crystalline, linear polyurea having a reduced viscosity of from about 0.12 to about 1.18, as defined in claim 9 wherein the organic secondary diamine has the general formula:

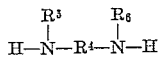

wherein $R^5$ and $R^6$ are monovalent hydrocarbon radicals and $R^4$ is a divalent hydrocarbon radical.

11. A thermoplastic, crystalline, linear polyurea, having a reduced viscosity of from about 0.12 to about 1.18, as defined in claim 9 wherein the organic secondary diamine has the general formula:

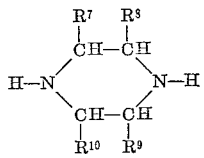

wherein $R^7$, $R^8$, $R^9$, and $R^{10}$ are selected from the group consisting of hydrogen and monovalent hydrocarbon radicals.

12. A thermoplastic, crystalline, linear polyurea, having a reduced viscosity of from about 0.12 to about 1.18, as defined in claim 9 wherein the piperazine-1,4-di-carbonyl halide is piperazine-1,4-di-carbonyl chloride.

13. A thermoplastic, crystalline, linear polyurea, having a reduced viscosity of from about 0.12 to about 1.18, as defined in claim 9 wherein the organic secondary diamine is N,N'-dimethyl hexamethylene diamine.

14. A thermoplastic, crystalline, linear polyurea, having a reduced viscosity of from about 0.12 to about 1.18, as defined in claim 9 wherein the organic secondary diamine is piperazine.

15. A thermoplastic, crystalline, linear polyurea, having a reduced viscosity of from about 0.12 to about 1.18, as defined in claim 9 wherein the organic, secondary diamine is N,N'-dimethyl ethylene diamine.

16. A thermoplastic, crystalline linear polyurea, having a reduced viscosity of from about 0.12 to about 1.18, as defined in claim 9 wherein the organic secondary diamine is N,N'-dimethyltrimethylene diamine.

17. A thermoplastic, crystalline, linear polyurea, having a reduced viscosity of from about 0.12 to about 1.18, as defined in claim 9 wherein the organic, secondary diamine is N,N'-diphenyl hexamethylene diamine.

18. A thermoplastic, crystalline, linear polyurea, having a reduced viscosity of from about 0.12 to about 1.18, as defined in claim 9 wherein R, $R^1$, $R^2$ and $R^3$ are hydrogen.

19. A thermoplastic, crystalline linear polyurea, having a reduced viscosity of from about 0.12 to about 1.18, as defined in claim 10 wherein $R^5$ and $R^6$ are alkyl radicals and $R^4$ is an alkylene radical.

20. A thermoplastic, crystalline, linear polyurea, having a reduced viscosity of from about 0.12 to about 1.18, as defined in claim 11 wherein $R^7$, $R^8$, $R^9$ and $R^{10}$ are hydrogen.

References Cited in the file of this patent

UNITED STATES PATENTS

| | | |
|---|---|---|
| Re. 24,691 | Steuber | Aug. 25, 1959 |
| 2,813,775 | Steuber | Nov. 19, 1957 |
| 2,816,879 | Wittbecker | Dec. 17, 1957 |
| 2,820,024 | Van der Kirk | Jan. 14, 1958 |
| 2,929,803 | Frazer et al. | Mar. 22, 1960 |

OTHER REFERENCES

Lyman et al.: Journal Polymer Science, vol. 40, pages 407–418, November 1959.

Roff: "Fibres, Plastics and Rubbers" (1956), Butterworth Scientific Publications, London, pages 262–263.

Hill: "Fibres From Synthetic Polymers," (1953), Elsevier Publishing Co., pages 301–322.

UNITED STATES PATENT OFFICE
CERTIFICATE OF CORRECTION

April 21, 1964

Patent No. 3,130,179

Robert J. Cotter

It is hereby certified that error appears in the above numbered patent requiring correction and that the said Letters Patent should read as corrected below.

Column 4, line 60, after "reaction" insert -- is --; line 63, for "of the" read -- by --; line 64, for "by" read -- of the --; column 5, line 34, for "fo" read -- of --; column 8, lines 50 to 56, in the formula of the organic secondary diamine a hydrogen atom should be attached to the right-hand nitrogen atom.

Signed and sealed this 22nd day of September 1964.

(SEAL)
Attest:

ERNEST W. SWIDER
Attesting Officer

EDWARD J. BRENNER
Commissioner of Patents